United States Patent Office 2,969,291
Patented Jan. 24, 1961

2,969,291

COATING PROCESS

Linton E. Simerl, North Haven, Conn., assignor to Olin Mathieson Chemical Corporation, a corporation of Virginia No Drawing. Filed June 10, 1957, Ser. No. 664,458

2 Claims. (Cl. 99—171)

This invention relates to an improved coating process, and particularly to an improved process for rapidly and substantially uniformly distributing an antibiotic over the surface of wrapping material.

Advantages of sheet material containing antibiotic for the packaging of meat, fish and poultry have been disclosed in copending application Serial Number 584,448, filed May 14, 1956, by Edward Hartshorne and now abandoned. In accordance with the above application, sheet material such as cellophane, paper parchment, cloth, polyethylene and other plastic film is coated or impregnated with an antibiotic to materially improve the utility as a preservative wrapper for such meat products.

Particular advantage results from the use of a water-soluble broad spectrum antibiotic or mixture thereof, such as chlortetracycline, tetracycline, oxytetracycline, polymyxin B, neomycin, or streptomycin, preferably in an amount of 5 to 25 milligrams per square meter of sheet area. Meat wrapped in such antibiotic-containing sheet and stored in a refrigerated display case was of essentially unimpaired quality after 72 to 96 hours' storage or longer, while in contrast, control samples wrapped in identical sheet not treated with antibiotic deteriorated in appearance, odor and taste after being stored for 48 hours and had become putrid and unuseable after 72 hours' storage.

The application of such minute amounts of antibiotic as 5 to 25 mg. per square meter of sheet area imposes a requirement that the method of application be such as to insure uniform distribution of antibiotic and perimt close control of its concentration in the coated sheet. Also, the treating process should be adapted for rapid production rates in order to be commercially practical. Attempts to accomplish this by the use of conventional wetting agents, such as alkali metal salts of higher alcohol sulfates, or glycol or glycerol mono-esters of higher fatty acids such as stearic and lauric acid, failed because of precipitation of antibiotic from water solution. Other wetting agents which might be effective would be difficult to remove from the coated sheet and may be unsuitable for use in contact with food products because of color, odor, flavor or toxicity.

The principal object of this invention is to provide a process for substantially uniformly and rapidly applying antibiotic to sheet materials. Further objects include the provision of stable aqueous solutions of antibiotic adapted to spread readily over the surface of sheet materials.

The above and other objects which will be apparent from the following detail description have been accomplished by dissolving the required amount of antibiotic in an aqueous solvent comprising 25% to 75% by weight of a monohydric alcohol containing two to three carbon atoms, that is, ethyl, proply or isopropyl alcohol or mixtures thereof, and substantially the balance of 75% to 25% water. Solvents within the above limits display a desirably low surface tension, generally within the range of about 25 to 35 dynes per centimeter, and readily wet and penetrate regenerated cellulose and other films or wrapping sheets, while possessing adequate solvent power for the antibiotic materials. At concentrations below about 25% alcohol, the surface tension is too high for effective and rapid wetting, while concentrations above about 75% may display insufficient solvent power for antibiotic. Solvent mixtures containing about 40% by weight alcohol are preferred as the wetting power is excellent, with surface tension values below about 30 dynes per centimeter, and the solubility of the antibiotic is high enough to permit the use of minimum volumes of solution.

The solution of antibiotic, preferably containing 2 to 5 grams per liter of antibiotic, may be applied to the wrapping material by any of the known coating methods. For example, an elongated web of the wrapping sheet may be treated by spraying with the solution or by immersion in the solution, excess being removed by draining or by means of a doctor blade. As coating on one side of the sheet is adequate, the preferred immersion process consists in passing the sheet over the submerged portion of a roll that is partly immersed in the coating solution.

Likewise, a roller coating process may be employed in which a film of solution, picked up by a rotating roll partly immersed in the solution, is transferred to a second roll, which is not immersed, rotates in the opposite direction and is held against the first roll, and is later transferred to the sheet under treatment as it passes over the second roll.

Preferably, the treatment is accomplished most accurately by passing the sheet or film between a rubber-covered press roll and an etched gravure roll which rotate in opposite directions. The latter roll runs partly immersed in the solution of antibiotic and excess of solution is removed therefrom by a doctor blade.

After being coated, the treated web is freed of solvent by a current of warm air or by gentle heating by means of infra-red lamps or coils, care being taken to avoid film termperatures above about 100° F. in order to avoid decomposition of antibiotic.

The following specific examples illustrating the process of this invention involved treatment with antibiotic dissolved in aqueous isopropanol, containing 40% by weight of the latter, of the uncoated side of MSAT cellophane, consisting of regenerated cellulose film coated on one surface with a plasticized paraffin-containing nitrocellulose lacquer. Essentially similar results may be obtained with other films or wrapping sheets and with the use of antibiotics other than chlortetracycline.

ROLLER COATING

| Example | Film speed, ft./min. | g./l. antibiotic | mg. antibiotic/sq. meter film |
|---|---|---|---|
| 1 | 110 | 3.0 | 6.1 |
| 2 | 110 | 3.5 | 7.7 |
| 3 | 110 | 4.0 | 8.5 |

GRAVURE ROLL COATING

| Example | Film speed, ft./min. | g./l. antibiotic | mg. antibiotic/sq. meter film |
|---|---|---|---|
| 4 | 100 | 3.0 | 8.1 |
| 5 | 200 | 3.0 | 9.9 |
| 6 | 350 | 3.0 | 9.5 |
| 7 | 112 | 4.0 | 12.1 |
| 8 | 167 | 4.0 | 11.9 |
| 9 | 570 | 4.0 | 10.9 |

The above data on antibiotic content of the treated film are average values based on closely agreeing analyses of five to ten one-half gram samples taken from different areas.

The gravure roll used in Examples 4–9 was uniformly etched to provide a 300 line screen, and resulted in quite uniform metering of coating solution. The main factor in determining the concentration of antibiotic in the finished wrapping sheet is the strength of the coating solution. The presence in the solvent of 25% to 75% by weight of monohydric alcohol containing two to three carbon atoms insures rapid wetting and spreading of the solution. Substantially uniform distribution of the desired amount of antibiotic per unit area of the sheet in film results when the coating conditions including speed of the sheet or film and pressure between the rolls are maintained constant.

Tests of the above antibiotic-containing films have shown that the storage life in saleable condition in refrigerated display cases of rib roasts, steaks, chops and other meat cuts wrapped therein is more than doubled as compared to similar roasts wrapped in untreated film, while bacterial counts are signficantly lower. Other series of tests have shown that the preservative quality is preserved even after 4 months' storage of the film at 75° F. and at 35% relative humidity.

I claim:

1. Process of making preservative wrapping material comprising coating cellophane with an aqueous solution of chlortetracycline in a solvent consisting essentially of water and 25% to 75% by weight of a monohydric alcohol chosen from the group consisting of ethyl, propyl and isopropyl alcohol, said solution being capable of rapidly wetting and penetrating said cellophane.

2. Process of making preservative wrapping material comprising coating cellophane with an aqueous solution of chlortetracycline in a solvent consisting essentially of water and about 40% by weight of isopropanol, said solution being capable of rapidly wetting and penetrating said cellophane.

References Cited in the file of this patent

UNITED STATES PATENTS

| | | |
|---|---|---|
| 105,142 | Torrey | July 5, 1870 |
| 2,495,743 | Lewis et al. | Jan. 31, 1950 |
| 2,571,849 | Elson | Oct. 16, 1951 |
| 2,574,526 | Borden | Nov. 13, 1951 |
| 2,671,806 | Winterbottom et al. | Mar. 9, 1954 |
| 2,740,816 | Starbird et al. | Apr. 3, 1956 |

FOREIGN PATENTS

| | | |
|---|---|---|
| 498,572 | Canada | Dec. 22, 1953 |

OTHER REFERENCES

Food Engineering, "Antibiotic Introduced as Spoilage Inhibitor for Fresh Poultry," January 1956, vol. 28, No. 1, pp. 43–48.